US012723441B2

(12) United States Patent
Debroucke et al.

(10) Patent No.: US 12,723,441 B2
(45) Date of Patent: Sep. 1, 2026

(54) VEHICLE DOOR LOCKING MECHANISM

(71) Applicant: Minebea AccessSolutions France, Alfortville (FR)

(72) Inventors: François Debroucke, Alfortville (FR); Jean-Baptiste Grislain, Alfortville (FR); Jean-Philippe Hochart, Alfortville (FR)

(73) Assignee: Minebea AccessSolutions France, Alfortville (FR)

( * ) Notice: Subject to any disclaimer, the term of this patent is extended or adjusted under 35 U.S.C. 154(b) by 29 days.

(21) Appl. No.: 18/882,943

(22) Filed: Sep. 12, 2024

(65) Prior Publication Data

US 2025/0092720 A1 Mar. 20, 2025

(30) Foreign Application Priority Data

Sep. 15, 2023 (EP) .................................... 23315356

(51) Int. Cl.
*E05B 77/22* (2014.01)
*E05B 83/36* (2014.01)
*E05B 85/10* (2014.01)

(52) U.S. Cl.
CPC .............. *E05B 77/22* (2013.01); *E05B 83/36* (2013.01); *E05B 85/10* (2013.01)

(58) Field of Classification Search
CPC .......... E05B 77/22; E05B 77/24; E05B 79/12; E05B 79/20; E05B 83/36; E05B 85/06; E05B 85/10; E05B 85/103; E05B 85/12; E05B 85/13; E05B 85/14; E05B 85/16; E05B 85/18
See application file for complete search history.

(56) References Cited

U.S. PATENT DOCUMENTS

| | | | | | |
|---|---|---|---|---|---|
| 5,895,081 | A * | 4/1999 | Tanimoto | E05B 85/12 | 292/336.3 |
| 7,302,818 | B2 * | 12/2007 | Usuzaki | F16C 1/08 | 74/502.4 |
| 8,414,038 | B2 * | 4/2013 | Bedekar | E05B 77/04 | 292/216 |
| 8,701,817 | B2 * | 4/2014 | Schoen | E05B 77/04 | 180/281 |
| 8,864,193 | B2 * | 10/2014 | Mori | E05B 79/20 | 292/336.3 |
| 9,290,971 | B2 * | 3/2016 | Amagai | E05B 53/003 | |
| 10,954,697 | B2 * | 3/2021 | Sugimoto | E05B 85/12 | |

(Continued)

FOREIGN PATENT DOCUMENTS

EP 2 703 581 A1 3/2014

*Primary Examiner* — Christopher J Boswell
(74) *Attorney, Agent, or Firm* — Oblon, McClelland, Maier & Neustadt, L.L.P.

(57) ABSTRACT

A vehicle door locking mechanism includes a lock cylinder for locking or unlocking a vehicle door by rotating a control paddle linked to a door latch, a kinematic lever provided on an inner door handle frame and linked to the door latch to allow opening of the door from inside a passenger cabin by rotation of an inner door handle, and a stopper knob supported by the inner door handle frame and a displaceable stopper which can be manually actuated by the stopper knob between a first position allowing rotation of the control paddle and a second position in which the stopper blocks the rotation of the control paddle preventing therefore opening of the vehicle door.

8 Claims, 3 Drawing Sheets

(56) References Cited

U.S. PATENT DOCUMENTS

| | | | | |
|---|---|---|---|---|
| 10,968,666 | B2 * | 4/2021 | Sugimoto | E05B 85/13 |
| 11,156,023 | B2 * | 10/2021 | Iwata | E05B 79/12 |
| 11,643,854 | B2 * | 5/2023 | Kin | E05B 79/20<br>292/336.3 |
| 2004/0148984 | A1 | 8/2004 | Robertson | |
| 2019/0316391 | A1 | 10/2019 | Bacon | |

* cited by examiner

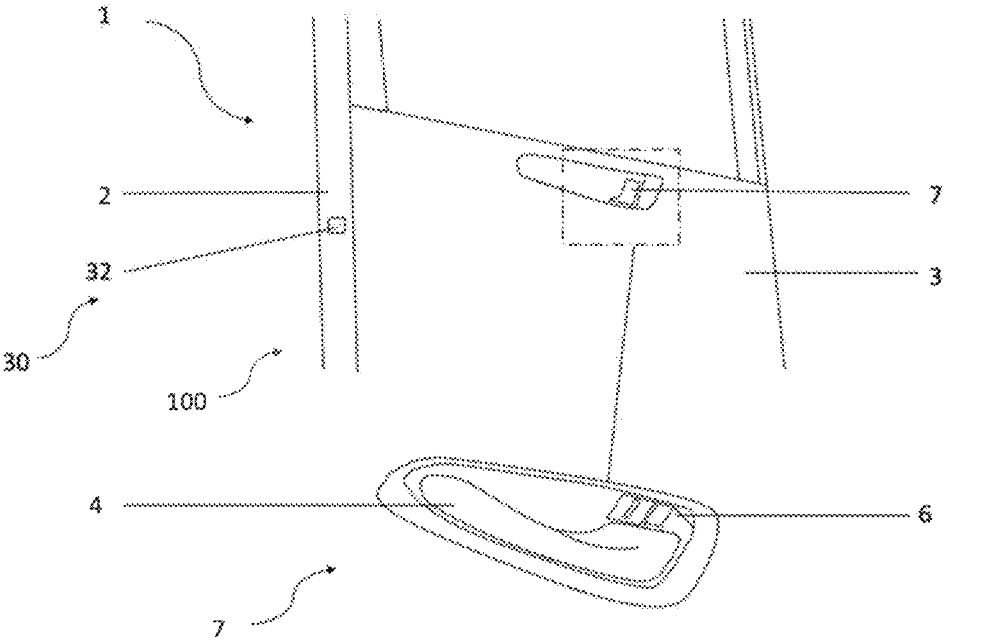
Figure 1a
Figure 1b
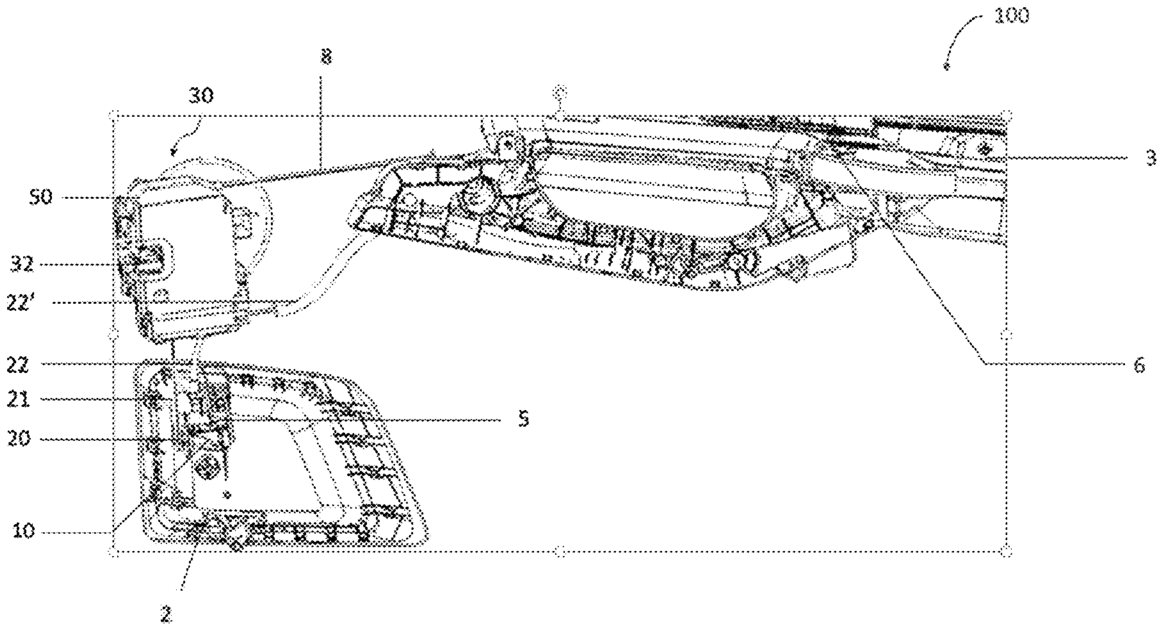
Figure 2

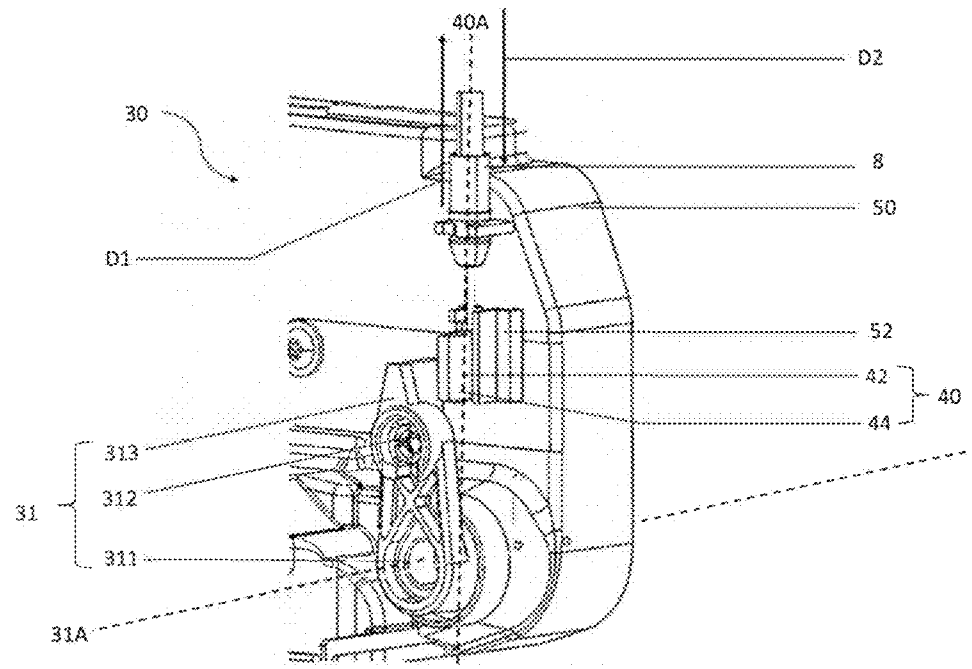
Figure 3
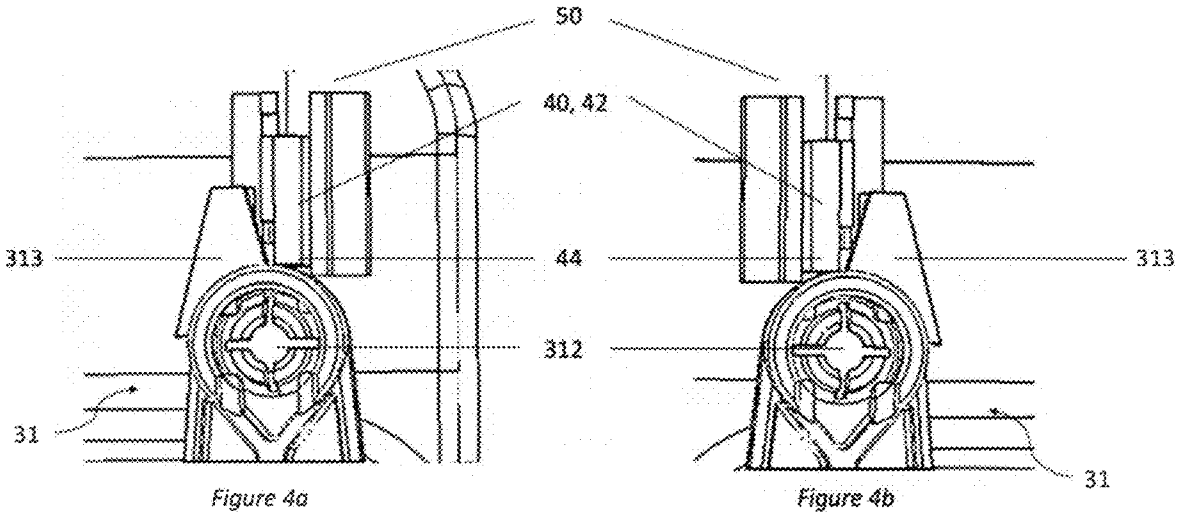
Figure 4a
Figure 4b

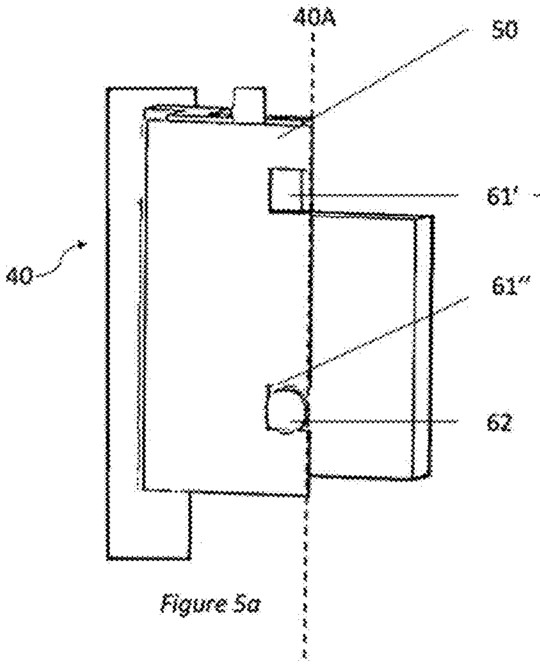
Figure 5a
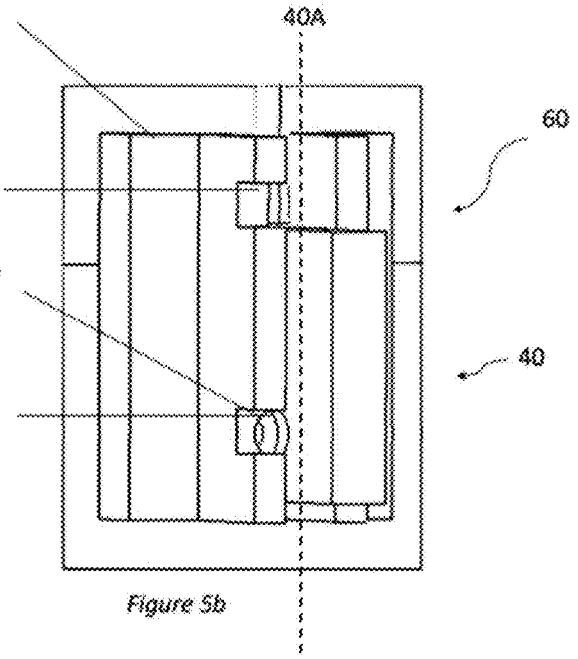
Figure 5b
[Fig. 6]
Figure 6a
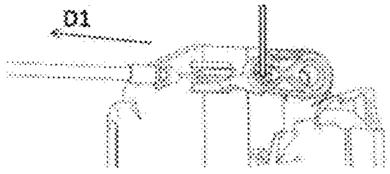
6a(i)
Figure 6b
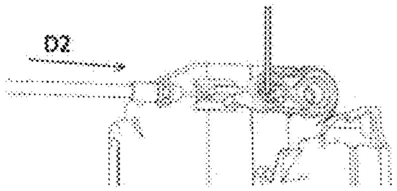
6b(i)
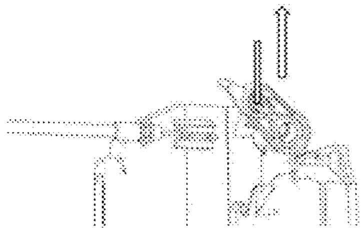
6a(ii)
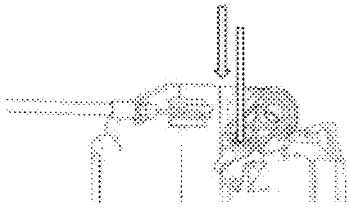
6b(ii)
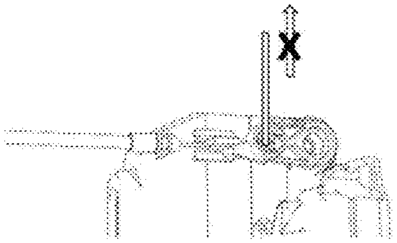
6b(iii)

VEHICLE DOOR LOCKING MECHANISM

The invention relates to the field of vehicle doors locking mechanism to control the locking and unlocking of the door from inside in order to prevent the opening of the door from the outside. The invention also relates to vehicle doors comprising such locking mechanism.

It is known from the state of the art, to provide a night lock system for a vehicle door which prevents break-ins, theft or invasion of the privacy of a driver inside the vehicle. The night lock system comprises a mechanical lock, in general a hardened pin, which can be mounted on an inner panel of the door. When activated, the mechanical lock blocks the door, preferably by inserting the pin around or into the armrest of the door, to prevent someone else from opening the door from outside.

However, such a night lock system is usually sold separately, in preference as an accessory which can be mounted on the door panel by the driver himself, and can require specific interfaces to be correctly installed.

Such a night lock system is usually appreciated in a double-crew vehicle, advantageously heavy-duty trucks, wherein the truck drivers take turn to rest inside the vehicle when said vehicle is required to stay stationary.

In general, both drivers have an authorised key adapted to open the vehicle door. At times, it may occur that one driver is resting inside the vehicle while the other driver uses his authorised key and by mistake invades the privacy of the resting one.

Since this night lock is not connected to the latching mechanism of the door, if not installed correctly, the risk of violation remains.

It is also known to provide for an inner door handle frame in a vehicle door, the frame supports an inner door handle which can be rotated to open the door from inside, and a key button which can be manually actuated to prevent unintentional opening of the door from inside the passenger cabin as well as intentional opening of the door by rotation of an outer door handle.

However, in such conventional configurations, the key button only blocks the latching system of the door and thus only prevents opening of the door by one of the inner or outer door handles. Someone who is in possession of an authorized key can unblock the latching system from outside to allow opening of the door using the outer door handle. Therefore, the risk of invasion still persists.

The purpose of the invention is to provide a vehicle door locking mechanism which is integrated in the vehicle door latching mechanism, to prevent the opening or mechanically unlocking of the vehicle from outside, even in case an individual is in possession of an authorized key to unlock the door.

To that end, the invention is directed towards a vehicle door locking mechanism comprising:

- a lock cylinder for locking or unlocking a vehicle door by rotating a control paddle linked to a door latch,
- a kinematic lever provided on an inner door handle frame and linked to the door latch to allow opening of the door from inside a passenger cabin by rotation of an inner door handle,
- the vehicle locking mechanism comprises a stopper knob supported by the inner door handle frame and a displaceable stopper which can be manually actuated by the stopper knob between a first position allowing rotation of the control paddle and a second position in which the stopper blocks the rotation of the control paddle preventing therefore opening of the vehicle door.

Thanks to the displaceable stopper, the rotation of the control paddle can be prevented so that it is not possible to unlock the latch by rotation of the locking cylinder even if an authorized key is inserted in the lock cylinder. Hence, by blocking the rotation of the lock cylinder, the unlocking of the vehicle door is prevented at the same time as the opening of the door from outside.

Furthermore, the arrangement of the stopper knob allows the same inner door handle frame to support two functionalities: one allowing opening of the door from the inside, and another one preventing the opening and unlocking of the door. More specifically, by rotating the inner door handle, the door can be opened and by actuating the stopper knob, the rotation of the control paddle can be blocked to prevent unlocking as well as opening of the door. Thus, it is easier for someone inside the passenger cabin to locate and juggle between the two functionalities.

The vehicle door mechanism may further present one or more of the following characteristics, taken separately or in combination.

- The stopper knob may be connected to the displaceable stopper by means of a cable, for example a Bowden cable, such that upon actuation the stopper knob, a traction is applied by the Bowden cable on the stopper which becomes resiliently biased between the first position and the second position. The stopper knob may be optionally connected to the displaceable stopper by any other resilient mean.
- The door latch comprises a control lever for unlocking the latch, the control lever is linked to the control paddle of the lock cylinder and the stopper is in contact of the latch in said second position.

The lock cylinder is, for example, provided with a key hole into which a key may be introduced and rotated to actuate the rotation of the control paddle.

The control paddle may be linked to the control lever in a rotational manner, for example by means of a rod or a cable, for example a Bowden cable such that rotation of the control paddle can actuate rotation of the control lever.

The control lever may therefore be rotated between a locking position and an unlocking position of the vehicle door by the rotation of the key.

The locking mechanism may allow locking of the door by a clockwise rotation of the control paddle or by an anticlockwise rotation.

When the stopper is moved into its second position, the stopper may be placed next to the control lever by providing a resistive force to counteract the rotative force transmitted to the control lever. By counteracting on the control lever, the stopper may also indirectly counteract the rotation of the control paddle. Therefore, even though an authorized key is introduced in the keyhole, the control paddle cannot be rotated to unlock the vehicle door and consequently the control lever cannot be rotated to unlock the latch. Hence, in the second position of the stopper, the vehicle door can neither be unlocked and nor can it be opened.

By the term "next to" it is understood that the stopper may be placed in a way to come into contact with the control lever in order to intercept the rotation pathway of the control lever. Therefore, irrespective of the clockwise or anticlockwise rotation of the key, the stopper may be arranged to intercept the rotation of control lever and hence may indirectly block the rotation of the control paddle.

The inner door handle is mechanically linked to the stopper knob via a Bowden cable such that an opening action on the inner door handle places the stopper in the first position allowing rotation of the control paddle.

Such an arrangement allows the inner door handle to displace the stopper into its first position to allow unlocking and instant opening of the door. Hence, a supplemental actuation of the stopper knob is not required if a user inside the passenger cabin wishes to unlock and open the door. Nevertheless, if the user only wishes to unlock the door without opening it, the stopper knob can be actuated to displace the stopper into its first position without opening the door.

The door latch and the stopper are housed in a common housing.

The stopper may be mounted in or on the housing of the door latch so as to be integrated in the locking mechanism of the latching mechanism.

The stopper is integrated to the door latch in such a way that it may interact directly with the control lever of the door latch, in order to prevent unlocking of the latch so that there is no need to use any additional safety lock, such as an additional night lock, when a driver wants to keep his privacy. The stopper ensures the locking of the vehicle door and at the same time ensures that the latch cannot be moved to open the door.

The control lever rotates according to a rotational axis, the stopper is configured to be displaced along a linear pathway which is substantially perpendicular to the rotational axis of the control lever.

Thanks to its linear perpendicular movement, the stopper is arranged to intercept the rotational pathway of the control lever by providing an optimal counterforce preventing unlocking the door latch.

The vehicle door locking mechanism may further comprise cooperating indexing elements disposed on the displaceable stopper on the one side and the housing on the other side.

The cooperating indexing elements may provide haptic feedback of the displaced positions of the stopper to inform the user the state in which the stopper is placed.

The first position allowing rotation of the control lever may correspond to a rest state of the stopper. The second position blocking the rotation of the control lever may correspond to an active state of the stopper in which said stopper may interact with the control lever.

Preferably, the cooperating indexing elements may comprise at least two notches provided on the stopper, and a flexible pin provided on the housing. The flexible pin may be configured to be snap-fitted into one of the notches according the desired position of the displaceable stopper.

The stopper may comprise a blocking end which may be configured to intercept the control lever of the latch in said second position.

It may be understood here that when the stopper is moved to the second position, the blocking end may come in contact with the control lever in order to provide a sufficient resistive force against the rotative force of the lever.

The control lever comprises a distal end provided with a blocking extension extending towards the stopper, the blocking end of the stopper is configured to intercept a blocking extension formed on the control lever.

Thanks to the interaction with the distal blocking extension of the control lever, the blocking end of the stopper is able to counteract the rotational force of the control lever by carrying out minimal work.

BRIEF DESCRIPTION OF THE FIGURE

The invention will be better understood and other characteristics and advantages will appear at the reading of the following description, given in an illustrative and non-limiting fashion, referring to the annexed figures in which, FIG. 1*a* is an inside view of a vehicle door comprising a vehicle door locking mechanism, FIG. 1*b* is a zoomed view of the inner door handle frame of the vehicle door in FIG. 1, FIG. 2 is an exploded view of a similar vehicle door comprising an exemplary embodiment of the present disclosure, FIG. 3 is a perspective view of a stopper in contact with a control lever of a door latch according to an exemplary embodiment of the present invention, FIGS. 4*a* and 4*b* are perspective views of a stopper in contact with a control lever of a door latch according to the clockwise or anti-clockwise rotation of the control lever, FIGS. 5*a* and 5*b* are respectively a side view and a frontal view of a stopper in a housing according to an exemplary embodiment of the present invention, FIG. 6 is a view of the vehicle door locking mechanism which is subjected to different circumstances.

DETAILED DESCRIPTION

A vehicle door locking mechanism 100 will be described with reference to FIGS. 1 to 6. The vehicle door locking mechanism 100 is provided inside a vehicle door 1 of a vehicle as illustrated in FIG. 1*a*, for example a truck door or an automobile vehicle door.

The present invention is in particular appreciated in a double-crew vehicle wherein at least two drivers have an authorized key. In the present description, it is understood that an authorized key can be a mechanical and/or an electronic key with remote control or handless access. The vehicle door locking mechanism 100 is configured to prevent one driver from invading the privacy of the other driver who is resting inside the passenger cabin although he has an authorized key.

The vehicle door 1 in FIG. 1*a*, comprises an outer panel 2 and an inner panel 3 between which the vehicle door locking mechanism 100 is arranged. In this view, the vehicle door locking mechanism 100 is only partially visible.

FIG. 1*a* partially shows a door latch 30 comprising a rotary latch fork 32 provided on a lateral side of the vehicle door 1, said latch fork 32 can rotate in a way to be reversibly engaged in a not shown door striker formed on a door frame of the vehicle door 1 for opening or closing the door 1. The latch fork 32 can be actuated by an inner door handle 4 or an outer door handle 5 (not visible on FIG. 1).

FIG. 1*b* shows an inner door handle frame 7 from FIG. 1*a* isolated from the vehicle door 1. The inner door handle frame 7 supports the inner handle door 4. In particular, a kinematic lever is provided on the inner door handle frame 7. The kinematic lever can be the inner door handle 4 provided on the inner door handle frame 7. The kinematic lever is linked to the door latch 30 to allow opening of the vehicle door 1 from inside the passenger cabin by rotation of the inner door handle 4. The kinematic lever can be linked to the door latch 30 via a Bowden cable or any other suitable mechanical link.

When the latch fork 32 is engaged in the striker, the door 1 is maintained closed, and when either one of door handles 4, 5 is rotationally actuated the latch fork 32 is released from the door striker to allow opening of the door 1.

The inner door handle frame 7 also supports a stopper knob 6 of a displaceable stopper 40 (the stopper is shown in more details in FIGS. 3-7). The stopper knob 6 can be manually actuated to block the release of the latch fork 32 thus preventing opening of the vehicle door 1 from outside and to prevent unlocking of the vehicle door 1 even when an authorized key is used. This operation will be further described in the following paragraphs. The stopper knob 6 can for example comprise a push-pull button mechanism or a pivoting knob.

In a push-pull button mechanism, the stopper knob 6 is mounted on a movable shaft along a vertical axis, the shaft being constrained by an internal spring such that when a pressure is applied on the stopper knob 6, the shaft can be moved between two vertical positions one allowing locking of the door and the other one allowing unlocking and opening of the door.

FIG. 2 illustrates an exemplary embodiment of the vehicle door mechanism 100 arranged between the outer panel 2 and the inner panel 3 of the vehicle door 1. The vehicle door locking mechanism 100 comprises a lock cylinder 10, a control paddle 20, a door latch 30 and the inner door handle frame 6.

In particular, only part of the outer panel 2 is shown supporting the lock cylinder 10 and the outer door handle 5, meanwhile the inner door handle frame 7 supporting the inner door handle 4 and the stopper knob 6 is not clearly visible but it can be visualized on FIG. 1.

The lock cylinder 10 includes an inner face which is connected to the control paddle 20, it also includes an outer face provided with a key hole not visible on the FIG. 2. The key hole is accessible from the outer panel 2, that is from outside, to allow introduction of an authorized key which can be rotated to actuate the rotation of the control paddle 20 for locking or unlocking of the vehicle door 1.

On FIG. 2, the door latch 30 is represented with the latch fork 32 mounted in a housing 50.

The control paddle 20 is mechanically linked to the door latch 30 in a rotational manner by means of a rod 21. Hence, a mechanical connection is established between the control paddle 20 and the door latch 30 to allow locking or unlocking of said door latch 30. Locking of the door latch 30 prevents either one of the handles 4, 5 from releasing the latch fork 32 to open the vehicle door 1.

The outer door handle 5 and the inner door handle frame 7, more specifically the inner door handle 4, are each linked to the door latch 30 by means of a Bowden cable 22, 22'. The Bowden cables 22, 22' allow to establish a mechanical connection between each of the handles 4, 5 and the door latch 30 so as to be able to actuate release of the latch fork 32 upon rotation of either one of the handles 4,5 for opening the vehicle door 1. The inner 4 and outer 5 door handles can be linked to the door latch 30 by other suitable mechanical means.

Furthermore, the inner door handle frame 7 is connected to the housing 50 of the door latch 30 by means of a stopper Bowden cable 8. More specifically, the stopper Bowen cable 8 connects the stopper knob 6 shown in FIG. 1, to a stopper 40 not visible in FIG. 2.

The stopper 40 is advantageously arranged to block the rotation of the control paddle 20 to prevent opening of the vehicle door 1 from outside. This operation will be better explained in the following paragraphs.

Referring to FIG. 3, the door latch 30 comprises a control lever 31 for unlocking the latch 30. The control lever 31 is linked to the control paddle 20 of the lock cylinder 10 by means the rod 21 shown in FIG. 2.

The control lever 31 is mounted on the housing 50 of the door latch 30 for controlling the unlocking of said latch 30. By unlocking the door latch, the latch fork 32 shown in FIGS. 1 and 2, can be released from the door striker to allow opening of the vehicle door 1 by rotation of either one of the inner 4 or outer 5 door handles.

More specifically, the control lever 31 presents a base body 311 pivotably mounted on the housing 50 of the door latch 30. The base body 311 comprises a distal end provided with a port 312 into which one end of the rod 21 shown in FIG. 2 can be engaged to cause rotation of the control lever 31. The control lever 31 can rotate according to a rotational axis 31A to allow unlocking of the door latch 30. Such a rotation may generate a torque to unlock the door latch 30.

Therefore, upon rotation of the control paddle 20, the control lever 31 can also be rotated according to its rotational axis 31A for unlocking the latch 30.

FIG. 3 also shows the stopper 40 mentioned above, which is placed between the outer panel 2 and inner panel 3 of the vehicle door 1. The stopper 40 is mounted in a way to be moved between a first and a second positions. In particulier, the first position where the stopper is pulled in direction D1, allows rotation of the control paddle 20, and the second position which is shown in FIG. 3 and corresponds to a pushed position in a direction D2, blocks the rotation of the control paddle 20 to prevent opening of the vehicle door 1 from the outside. This operation is going to be further explained in the following paragraphs.

The stopper knob 6 shown in FIG. 1 is connected to the stopper 40 by means of the stopper Bowden cable 8 shown in FIG. 2. Upon actuation of the of stopper knob 6, a traction or a push is applied by the Bowden cable 8 on the stopper which becomes resiliently biased between the first position and the second position or inverse to allow displacement of the stopper 40.

As shown of FIG. 3, the stopper 40 is configured to be displaced along a linear pathway 40A which is substantially perpendicular to the rotational axis 31A of the control lever. The stopper 40 can be displaced along guide rails 52 provided on the housing 50, between the first and second positions.

By housing the stopper 40 in the same housing 50 as the door latch 30 and thanks to its linear perpendicular pathway, the stopper 40 is able to interact directly with the control lever 31 in order to intercept its rotational pathway. Therefore, there is no need to use any additional safety lock, such as an additional night lock, when a driver wants to keep his privacy.

The stopper 40 preferably presents a parallelepiped flat block 42 which can be displaced along the guide rails 52 in the shape of ribs. The flat block 42 presents a blocking end 44 which is configured to intercept the control lever 31 of the door latch 30 in the second position. FIG. 3 shows the stopper 40 in the second position wherein said stopper is placed in contact with the control lever 31.

The control lever 31 comprises a distal end provided with a blocking extension 313 which extends towards the stopper 40. The blocking end 44 of the stopper 40 is configured to intercept a blocking extension 313 formed on the control lever 31.

Thanks to the interaction with the distal blocking extension 313 of the control lever 31, the blocking end 44 of the stopper 40 is able to counteract the rotational force of the control lever 31 by carrying out minimal work.

By being in contact with the control lever 31, the stopper 40 can provide a resistive force to counteract the rotative force of the control lever 31 in order to block the rotation of the control lever 31 preventing it from unlocking the door latch 30 and hence to prevent opening of vehicle door 1 when the outer handle 5 is actuated.

By blocking the rotation of the control lever 31, the stopper 40 can also indirectly block the rotation of the control paddle 20 due to the mechanical connection established by the rod 21 shown in FIG. 2. Therefore, even though an authorized key is introduced in the keyhole 11, the control paddle 20 cannot be rotated to unlock the vehicle door 1 and consequently the control lever 31 cannot be rotated either to unlock the latch 30.

In particular the latch 30 may comprise electrical actuators which may be controlled by a remote key, not shown, activated by a driver through a remote control. In case a remote control is used to unlock the vehicle door 1, the fact that the control lever 31 is blocked also prevents unlocking of the latch 30 by the remote key.

Hence, in the second position of the stopper 40, the vehicle door 1 can neither be unlocked and nor can it be opened. In other words, the stopper 40 ensures the locking of the vehicle door 1 and at the same time ensures that the latch 30 cannot be moved to open the door.

Depending on the door (right or left door) on which it is mounted, the control paddle 20 can be configured to be rotated in a clockwise direction for locking the door 1, or configured to be rotated in an anticlockwise direction. The stopper 40 is ideally placed to intercept the rotational pathway of the control lever 31. FIG. 4*a* shows a stopper 40 whose blocking end 44 is arranged to block a control lever 31 having a clockwise rotational pathway and FIG. 4*b* shows a blocking end 44 arranged to block a control lever 31 with an anticlockwise rotational pathway.

Referring to FIGS. 5*a* and 5*b*, the vehicle door locking mechanism 100 further comprises cooperating indexing elements 60 disposed on the slidable stopper 40 on the one side and the housing 50 on the other side to ensure that the stopper 40 stays put in a desired position.

The cooperating indexing elements 60 comprise two notches 61', 61" provided on the housing 50, and a flexible pin 62 provided on the stopper 40. The flexible pin 62 is configured to be snap-fitted into one of the notches 61', 61" according the desired position of the sliding stopper 40.

Theses indexing elements 60 can provide haptic feedback of the sliding positions of the stopper 40 to inform the user the state in which the stopper 40 is placed.

The first position allowing rotation of the control lever 31 may correspond to a rest state of the stopper 40. The second position blocking the rotation of the control lever 31 may correspond to an active state of the stopper 40 in which said stopper may interact with the control lever 31.

The inner door handle 4 is mechanically linked to the stopper knob 6 via a Bowden cable or a linkage such that an opening action on the inner door handle 4 places the stopper 40 in the first position allowing rotation of the control paddle 20.

Such an arrangement allows the inner door handle 4 to move the stopper 40 into its first position to allow unlocking and instant opening of the vehicle door 1. Thus, the inner handle 4 is connected to the stopper in a way to allow the disengagement of the flexible pin from the notch 61" corresponding to its active state.

Hence, a supplemental actuation of the stopper knob 6 is not required if the driver inside the passenger cabin wishes to unlock and open the vehicle door 1. Nevertheless, if the driver only wishes to unlock the door 1 without opening it, the stopper knob 6 can be actuated to displace the stopper 40 into its first position without opening the vehicle door 1.

FIG. 6 represents different circumstances in which the vehicle door locking mechanism 100 can be subjected.

In FIG. 6*a*, the stopper 40 is in the first position corresponding to a rest state wherein the stopper 40 is pulled in the direction D1 and, in preference the blocking end 44, is not placed in contact with the control lever 31. FIGS. 6*a* (i) and 6*a* (ii) show that the stopper 40 is placed out of the rotational pathway of the control lever 31, hence allows its rotation for unlocking the vehicle door 1 (FIG. 6*a* (ii)). In this position, the control paddle 20 can also be rotated using an authorized key, and opening of the door 1 is possible.

In FIG. 6*b*, the stopper 40 is placed in the second position corresponding an active state wherein the stropper 40 is pushed in the direction D2 and, in preference the blocking end 44, is in contact with the control lever 31 in order to intercept the rotational pathway of the control lever 31. As stated above, this is the «nightlock position» preventing anyone even with an authorized key (mechanical or remote) to unlock and open the door 1. In FIG. 6*b* (i), the stopper 40 is in contact with the control lever 31 and provides a resistive force to counteract the rotational force of the control lever 31 such that rotation of the control lever 31 is blocked (FIG. 6*b* (iii)). Therefore, unlocking of the vehicle door 1 is prevented, as well as its opening.

Though in the second position, the control lever 31 cannot be rotated to allow unlocking of the door, it can rotate in an opposite direction to allow locking of the vehicle door 1 from inside, as shown in FIG. 6*b* (ii). For example, when a first driver wants his privacy while being inside the vehicle, he can slide the stopper 40 to the second position and additionally lock the door 1 from the inside for added safety.

REFERENCE LIST

100: Vehicle door locking mechanism
1: Vehicle door
2: outer panel
3: inner panel
4: inner door handle
5: outer door handle
6: stopper knob
7: inner door handle frame
8: stopper Bowden cable
10: lock cylinder
20: control paddle
21: rod
22, 22': Bowden cable
30: door latch
31: control lever
31A: rotational axis of control lever 31
311: base body
312: port
32: latch fork
40: stopper
40A: linear pathway of stopper
42: flat block
44: blocking end
50: housing
52: guide rails
61', 61": notch
62: flexible pin
D1: pulled direction
D2: pushed direction

The invention claimed is:

1. A vehicle door locking mechanism comprising:

a lock cylinder configured to lock or unlock a vehicle door by rotating a control paddle linked to a door latch;

a kinematic lever provided on an inner door handle frame and linked to the door latch to allow opening of the door from inside a passenger cabin by rotation of an inner door handle; and a stopper knob supported by the inner door handle frame and a displaceable stopper which is configured to be manually actuated by the stopper knob between a first position allowing rotation of the control paddle and a second position in which the stopper blocks the rotation of the control paddle to prevent an unlocking of the latch from outside of the vehicle door and therefore an opening of the vehicle door even via an authorized key.

2. The vehicle door locking mechanism according to claim 1, wherein the inner door handle is mechanically linked to the stopper knob via a Bowden cable such that an opening action on the inner door handle places the stopper in the first position allowing rotation of the control paddle.

3. The vehicle door locking mechanism according to claim 1, wherein the door latch and the stopper are housed in a common housing.

4. The vehicle door locking mechanism according to claim 3, further comprising cooperating indexing elements disposed on the displaceable stopper on a first side and on the housing on a second side.

5. The vehicle door locking mechanism according to claim 1, wherein the door latch comprises a control lever for unlocking the latch, the control lever is linked to the control paddle of the lock cylinder and the stopper is in contact of the latch in said second position.

6. The vehicle door locking mechanism according to claim 5, wherein the control lever rotates according to a rotational axis, the stopper is configured to be displaced along a linear pathway which is substantially perpendicular to the rotational axis of the control lever.

7. The vehicle door locking mechanism according to claim 5, wherein the stopper comprises a blocking end which is configured to intercept the control lever of the latch in said second position.

8. The vehicle door locking mechanism according to claim 5, wherein the control lever comprises a distal end provided with a blocking extension extending towards the stopper, the blocking end of the stopper is configured to intercept a blocking extension formed on the control lever.

* * * * *